United States Patent
Pascual et al.

(10) Patent No.: US 6,943,791 B2
(45) Date of Patent: Sep. 13, 2005

(54) Z-SLOPE TEST TO OPTIMIZE SAMPLE THROUGHPUT

(75) Inventors: Mark E. Pascual, San Jose, CA (US); Michael G. Lavelle, Saratoga, CA (US); Michael F. Deering, Los Altos, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 543 days.

(21) Appl. No.: 10/094,947

(22) Filed: Mar. 11, 2002

(65) Prior Publication Data

US 2003/0169252 A1 Sep. 11, 2003

(51) Int. Cl.7 ............................................... G06T 15/40
(52) U.S. Cl. ....................... 345/421; 345/422; 345/530; 345/536
(58) Field of Search ......................... 345/419, 421–422, 345/611–614, 530, 536

(56) References Cited

U.S. PATENT DOCUMENTS

| 5,278,949 | A | * | 1/1994 | Thayer ........................ 345/426 |
| 5,706,415 | A | | 1/1998 | Kelley et al. |
| 6,160,557 | A | | 12/2000 | Narayanaswami |
| 6,369,828 | B1 | | 4/2002 | Lewis |
| 6,697,063 | B1 | * | 2/2004 | Zhu ........................... 345/421 |
| 6,762,765 | B2 | * | 7/2004 | Doyle et al. ................. 345/565 |

* cited by examiner

Primary Examiner—Matthew C. Bella
Assistant Examiner—Po-Wei (Dennis) Chen
(74) Attorney, Agent, or Firm—Meyertons Hood Kivlin Kowert & Goetzel, P.C.; Jeffrey C. Hood

(57) ABSTRACT

A system and method are disclosed for utilizing a Z slope test to select polygons that may be candidates for multiple storage methods. The method may calculate the absolute Z slope from vertex data and compare the calculated value with a specified threshold value. In some embodiments, for polygons that have an absolute Z slope less than the threshold value, parameter values may be rendered for only one sample position of multiple neighboring sample positions. The parameter values rendered for the one sample position may then be stored in multiple memory locations that correspond to the multiple neighboring sample positions. In some embodiments, storing parameter values in multiple memory locations may be achieved in a single write transaction. In some embodiments, utilization of the Z slope test method may be subject to user input and in other embodiments may be a dynamic decision controlled by the graphics system.

20 Claims, 12 Drawing Sheets

Z-SLOPE TEST TO OPTIMIZE SAMPLE THROUGHPUT

BACKGROUND OF THE INVENTION

1. Field of the Invention

This invention relates generally to the field of computer graphics and, more particularly, to high performance computer graphics systems.

2. Description of the Related Art

Early graphics systems were limited to two-dimensional (2D) graphics, were configured to compute a gray scale value for each pixel displayed, and acted as simple translators or interfaces to a display device. Modem high performance graphics systems, however, may support three-dimensional (3D) graphics with one or more special effects such as anti-aliasing, texturing, shading, fogging, alpha-blending, and specular highlighting. 3D graphics data may be several orders of magnitude larger than comparable 2D graphics data. 3D graphics data may include a set of information components for each vertex of the geometric primitives used to model the objects to be imaged.

In recent years, demand for high performance graphics systems that can render complex three-dimensional (3D) objects and scenes have increased substantially. This increase is at least in part due to the demand for new applications such as computer-generated animation for motion pictures, virtual reality simulators/trainers, and interactive computer games. These new applications place tremendous computational loads upon graphics systems. Modem computer displays have also improved and have a significantly higher pixel resolution, greater color depth, and are able to display more complex images with higher refresh rates than earlier models. Consequently, modern high performance graphics systems incorporate graphics processors with a great deal of complexity and power, and the color value of one pixel may be the accumulated result of many calculations involving several models and mathematical approximations.

With each new generation of graphics system, there is more image data to process, the processing is more complex, and there is less time in which to process it. This need for more processing power is being met with the combination of more hardware resources and/or more efficient processes.

SUMMARY OF THE INVENTION

The problems set forth above may at least in part be solved by a system and method for utilizing a Z slope test to select polygons that may be candidates for multiple storage methods. The method may calculate the absolute Z slope from vertex data and compare the calculated value with a specified threshold value. For polygons that have an absolute Z slope less than the threshold value, parameter values may be rendered for only one sample position of multiple neighboring sample positions. The parameter values rendered for the one sample position may then be stored in multiple memory locations that correspond to the multiple neighboring sample positions. In some embodiments, storing parameter values rendered for one sample position in multiple memory locations may be achieved in a single write transaction. Utilization of the Z slope test method may be subject to user input and in other embodiments may be a dynamic decision controlled by the graphics system.

The graphics system may include an input, a render processor, and a plurality of memories. In some embodiments, additional components may be connected to the system including one or more display devices, one or more input devices, and/or a host processor.

The input may receive 3-D graphics data corresponding to a polygon that may include vertex data, instructions for assembling the vertexes into polygons, and instructions for selection of a mode or a conditional mode for storing rendered parameter values for one sample position into multiple memory locations. The mode of storing is referred to herein as mode N, where N is a positive integer that specifies the number of memory locations. A render processor may be operable to determine if parameter values of a group of neighboring sample positions within the polygon meet the specified conditions for a conditional mode. The render processor may also store parameter values rendered for a first sample position (selected from a group of N neighboring sample positions) in N memory locations that correspond to the N neighboring sample positions. Parameter values include, but are not limited to color values (red, green, and/or blue), alpha, and Z.

The user may specify the storage mode N and the media processor may incorporate the specified mode with the graphics data for a polygon. In other embodiments, the storage mode may be set for all processing, for the processing of regions of the image such as the sky, or for processing large objects with insubstantial differences in color. The mode may be varied dynamically in response to a need for real time display of a very complex image or for situations where the complexity of the image changes dramatically in real time.

For mode 2 (also referred to as Buddy Mode), the plurality of memory locations may be designed to receive parameter values for two neighboring sample positions identical to the parameter values rendered for the first sample position of the two sample positions. For mode 4 (also referred to as Quad Mode), the plurality of memory locations is designed to receive parameter values for four neighboring sample positions identical to the parameter values rendered for the first sample position of the four sample positions.

Utilization of a method for storage of a rendered sample to multiple memory locations may be subject to a conditional test. Each specific conditional test may be designed to primarily utilize a multiple storage method in regions of the image or portions of objects that may have a reduced probability of creating undesirable artifacts in the rendered image. Areas of the image that are smooth and/or evenly colored may be prime candidates for a conditional multiple storage method as described herein.

A method with a conditional test may calculate the value or values needed for the specified test from vertex data and compare the calculated value with a specified limit. In some embodiments, a multiple storage mode may only be utilized for polygons greater than a certain size. In other embodiments, a multiple storage mode may be utilized for polygons that have an absolute Z slope less than a threshold value. In these applications, a user may utilize a high threshold value as a means to speed processing and ensure a real time display of a complex image. In some embodiments, a multiple storage method is utilized for polygons that have insubstantial differences between parameter values for neighboring sample positions within the polygon. Still other embodiments may use a conditional mode called Edge mode N. If an edge of the polygon intersects a sample bin, each sample position that is within the sample bin and within the polygon is individually rendered and stored. If an edge of the polygon does not intersect the sample bin, then the sample positions that are within the sample bin and within the polygon may be processed with a mode N method discussed above.

The efficiency improvements of the various methods discussed may vary with the selection of a storage mode N, and may be influenced by the number of individual memories connected to a common bus and the number of samples per pixel specified.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
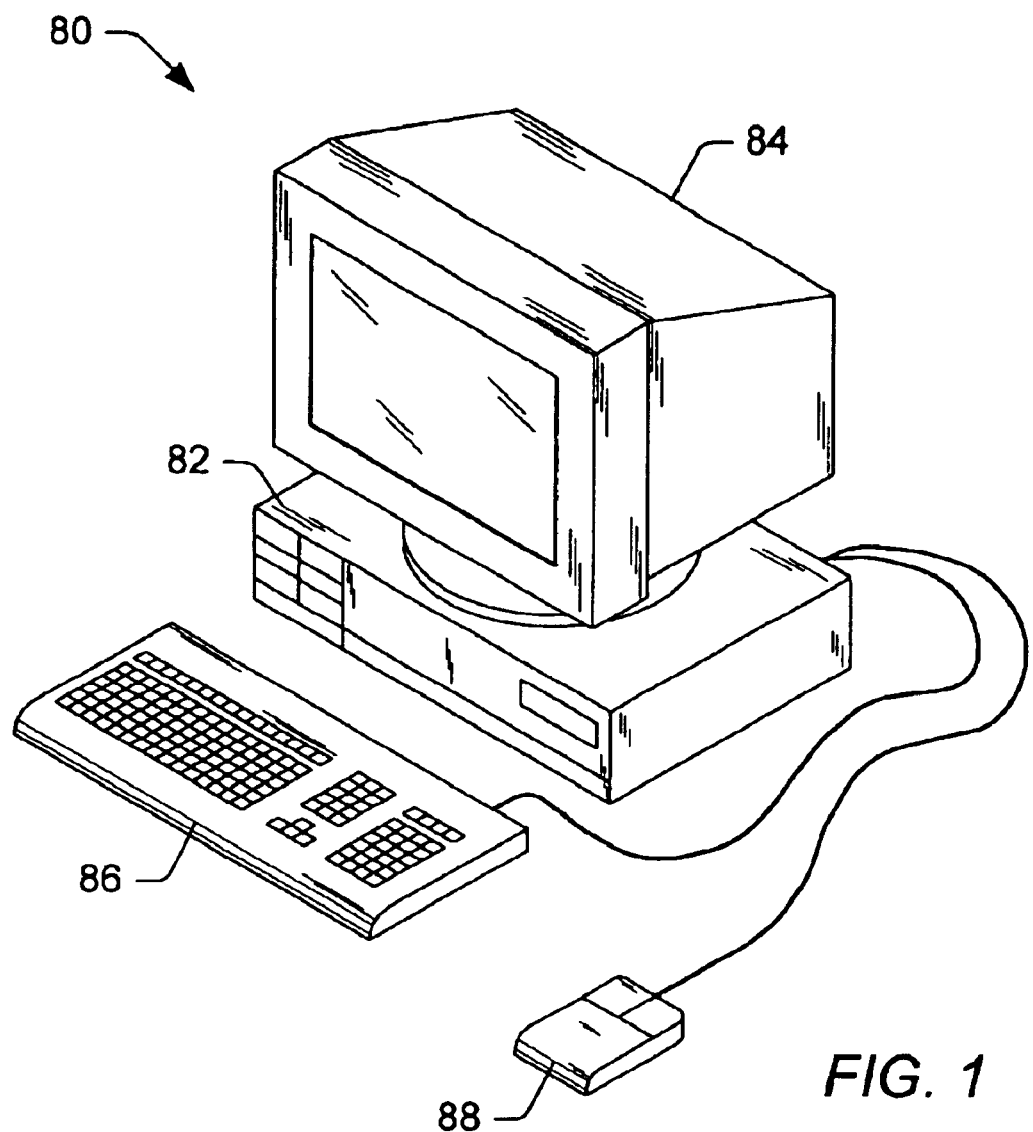
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
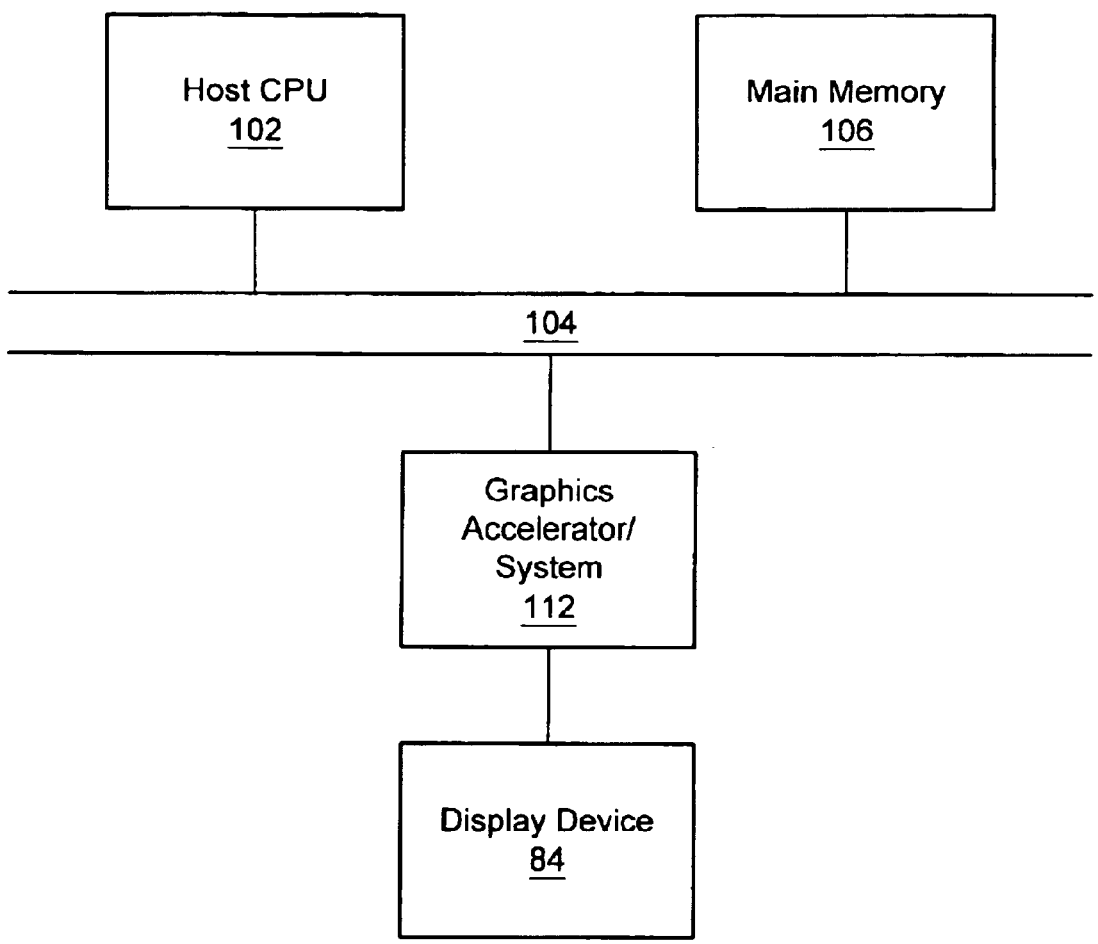
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 maybe implemented in software.

Figure 3:
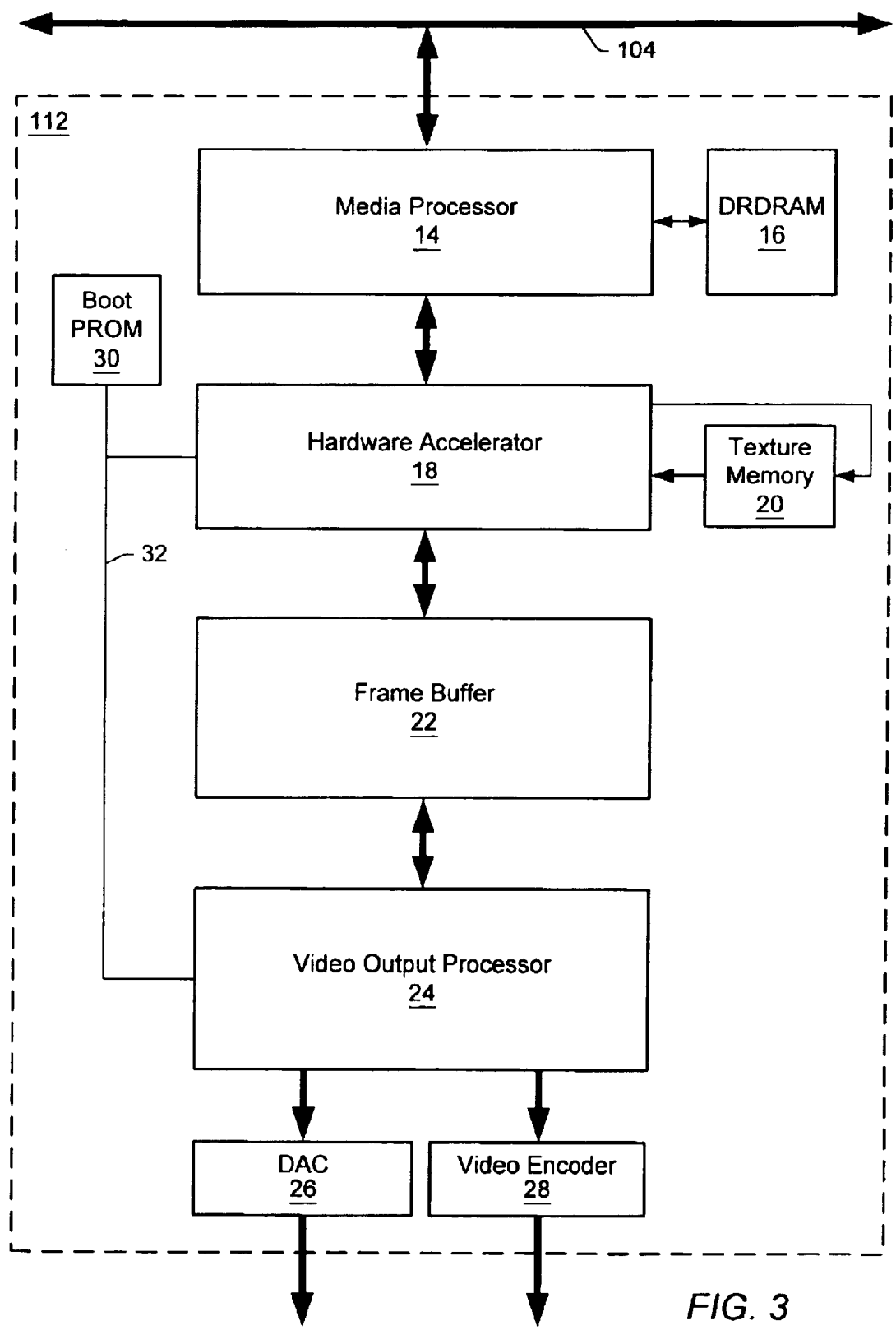
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
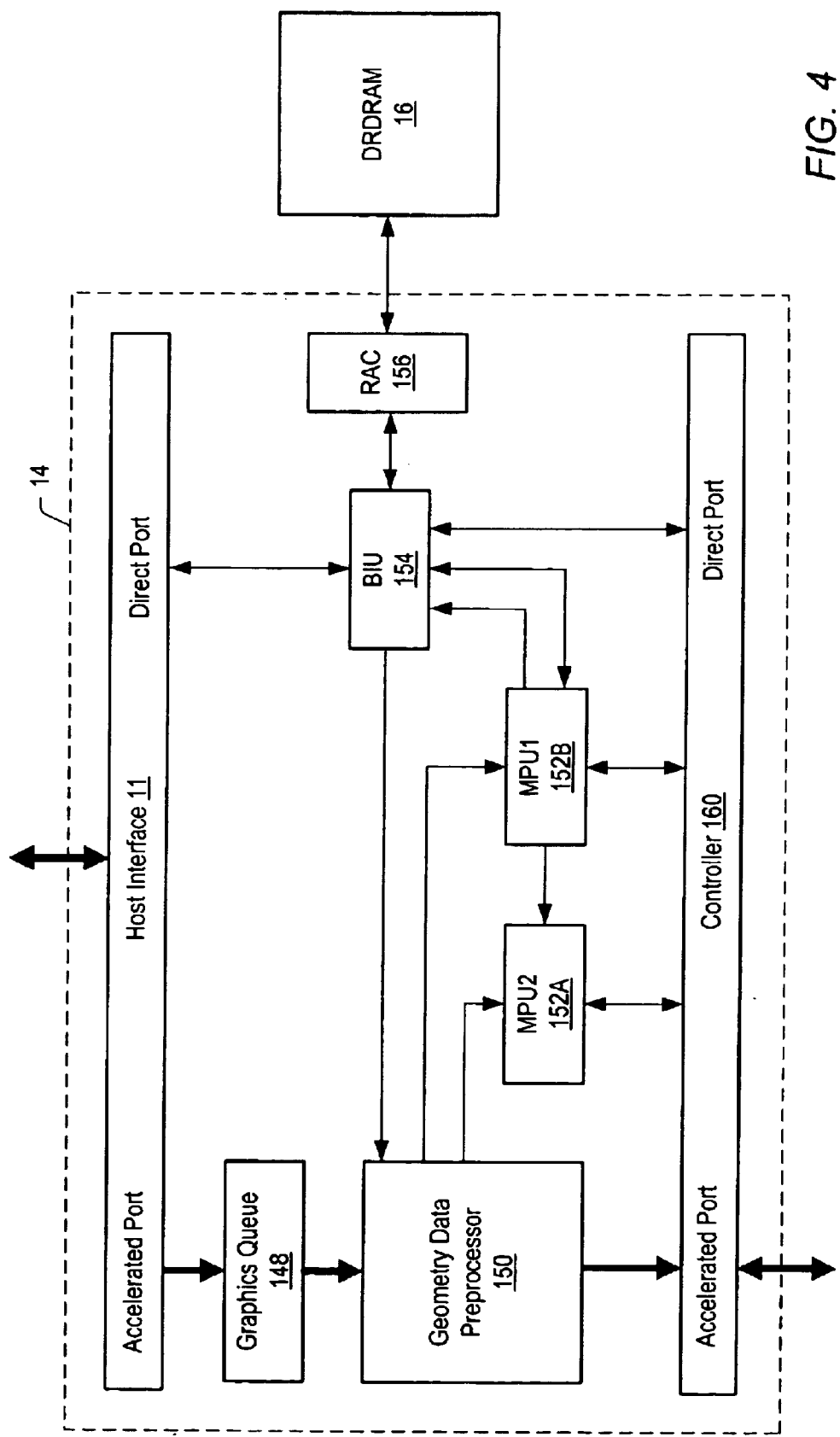
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
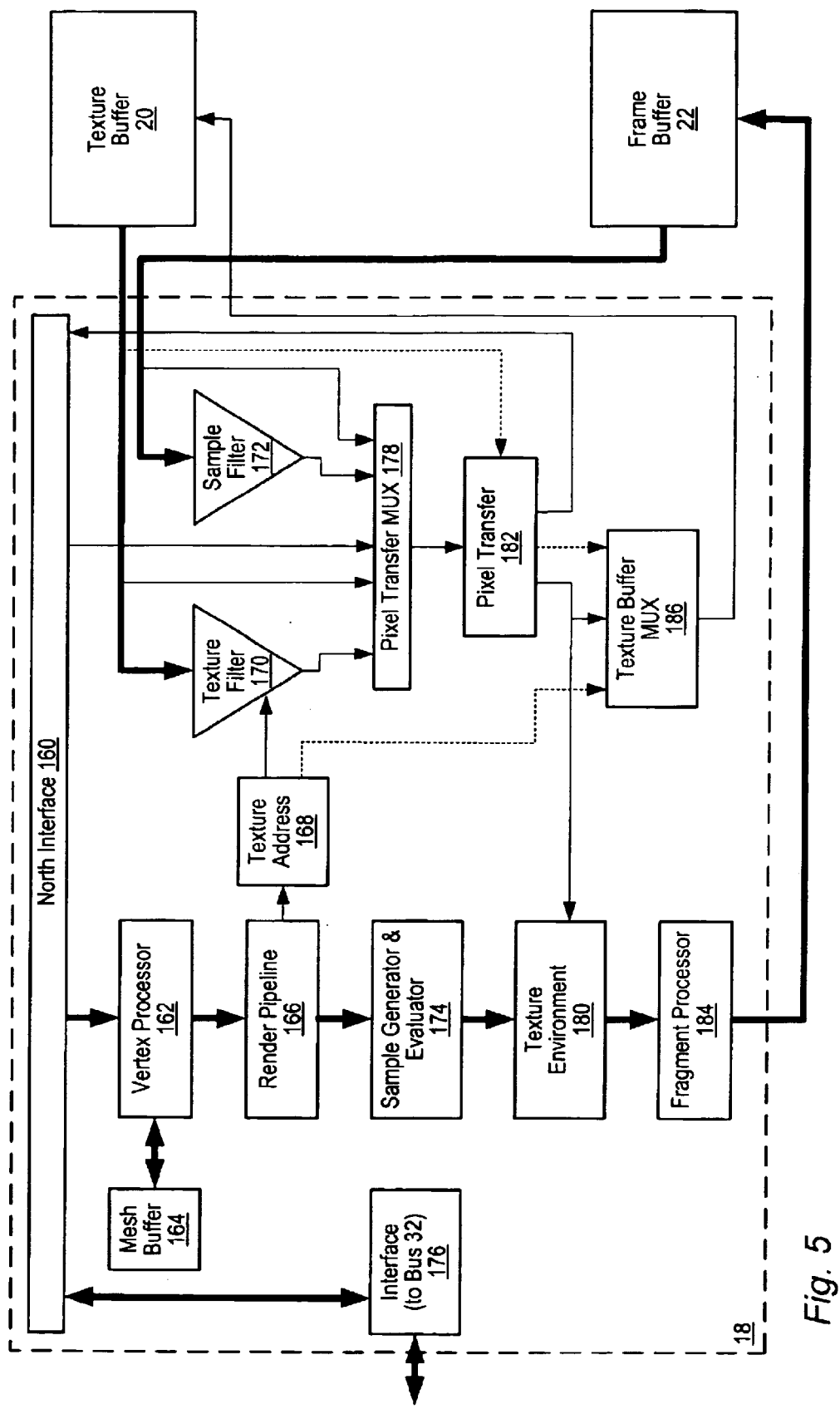
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space.

For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e. transparency);
z (i.e. depth); and
s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
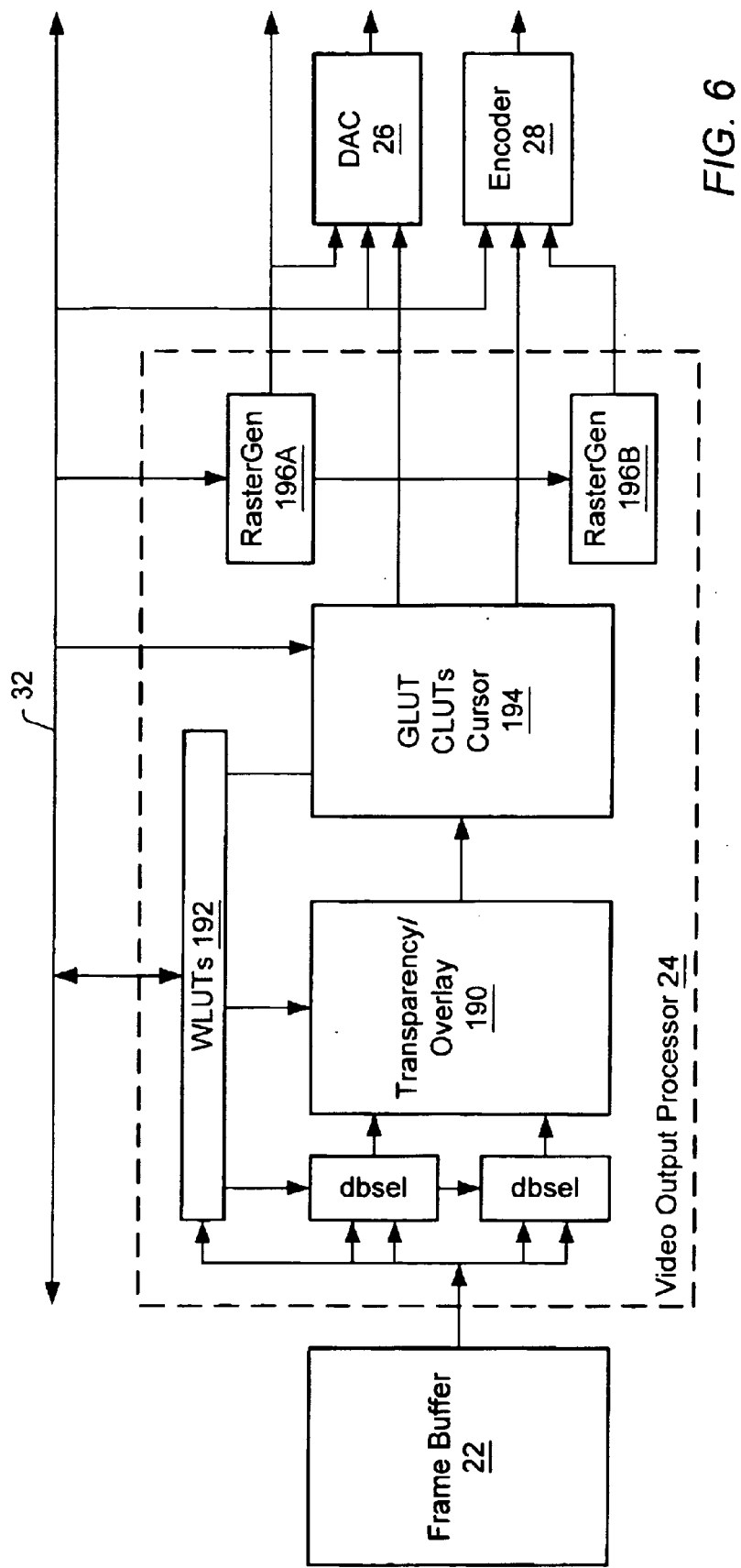
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-To-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
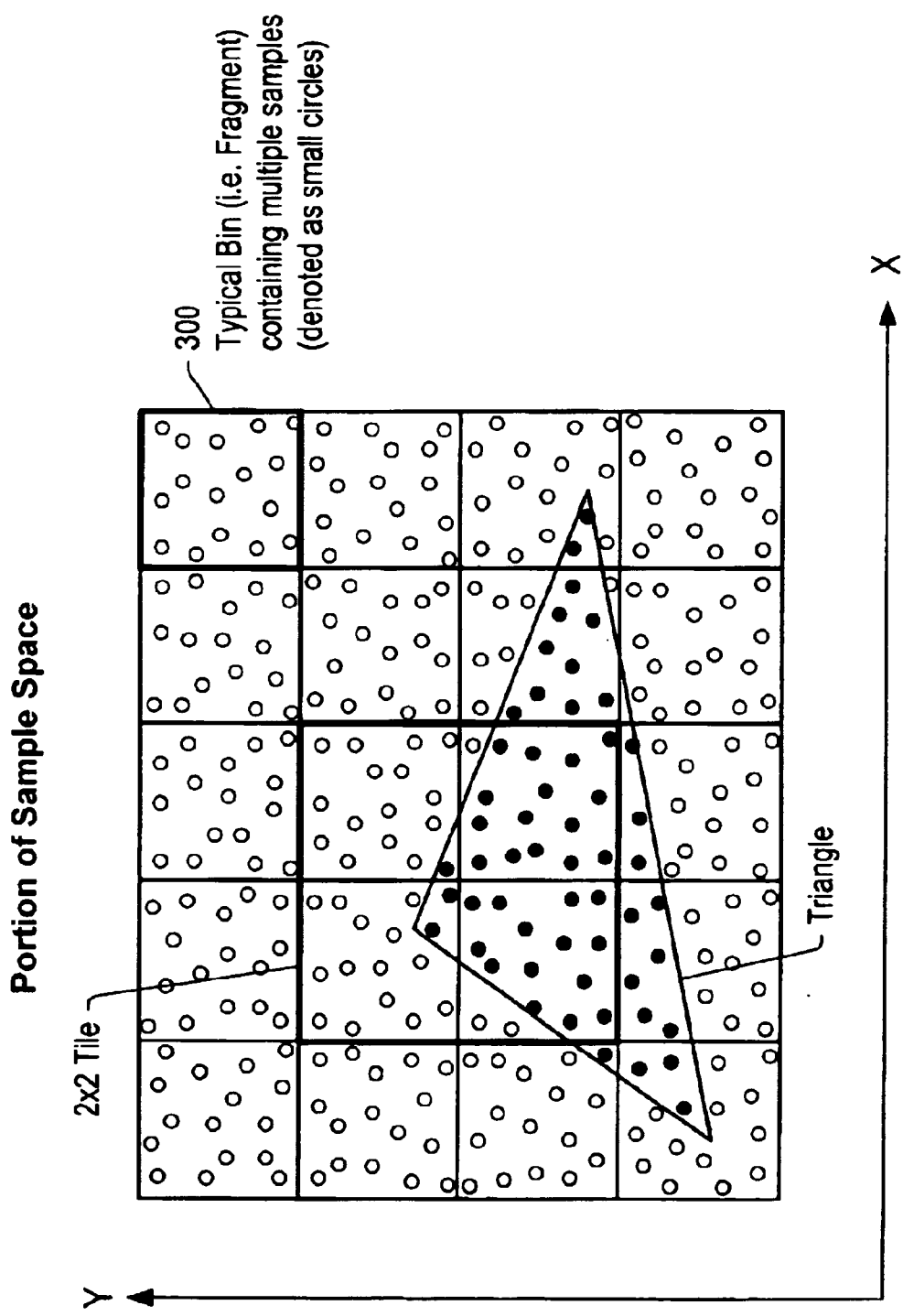
FIG. 7 is an illustration of a sample space partitioned into an array of bins.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7.

Each bin may contain one or more samples. The number of samples per bin may be a programmable parameter.

Figure 8:
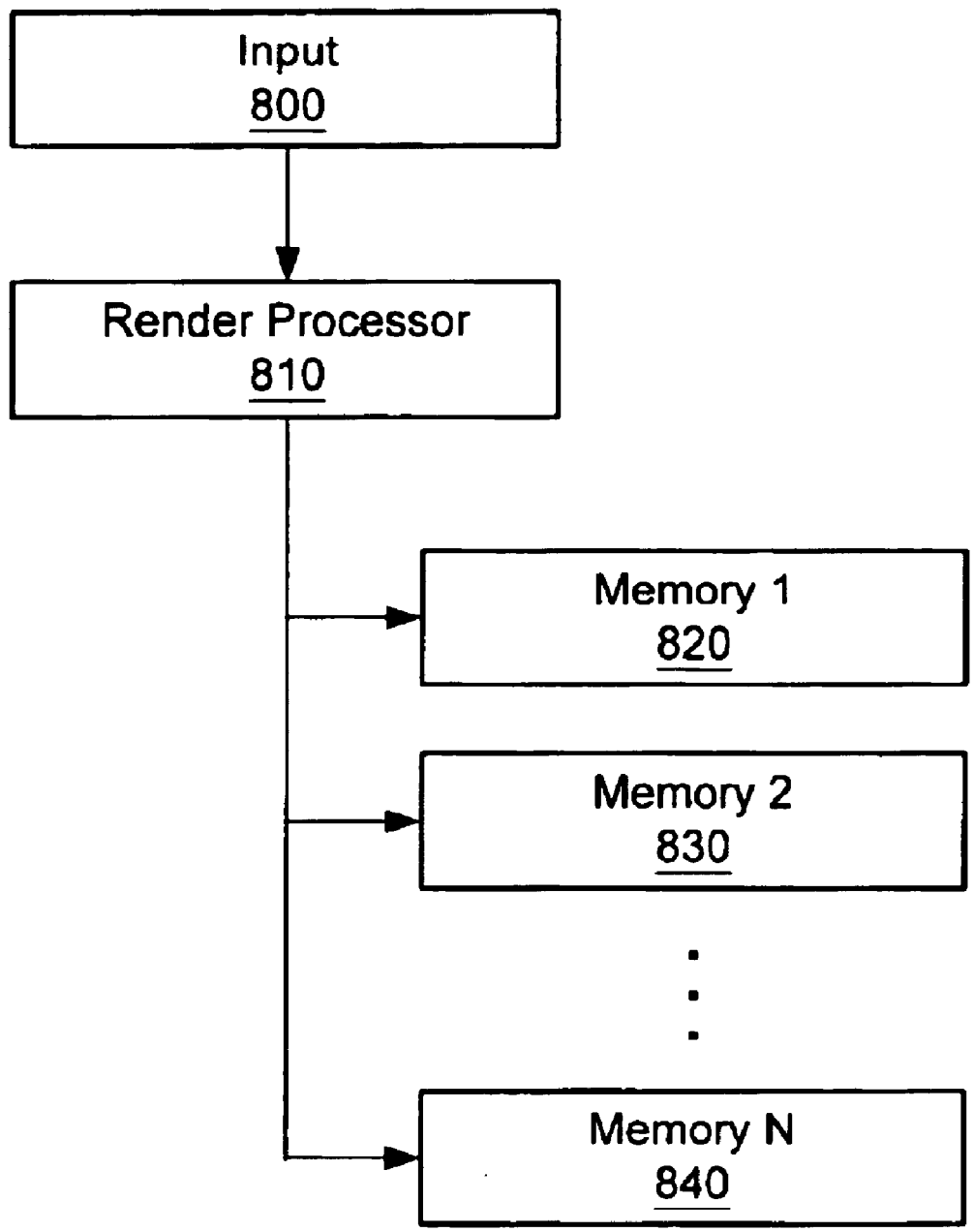
FIG. 8 is a simplified block diagram of one embodiment of a system for rendering three-dimensional images.

System for Storage of a Sample to Multiple Memory Locations—FIG. 8

FIG. 8 provides a block diagram of one embodiment of a graphics system for storing parameter values rendered for one of N neighboring sample positions in N memory locations corresponding to the N neighboring sample positions, where N is a positive integer. The system includes an input 800, a render processor 810, and a plurality of memories 820–840.

In some embodiments, the input 800, may receive 3-D graphics data corresponding to a polygon from media processor 14. The 3-D graphics data may include vertex data, instructions for assembling the vertexes into polygons, and instructions for selection of a mode or a conditional mode for storing rendered parameter values for one sample position into multiple memory locations.

In some embodiments, the render processor 810 may be operable to determine if parameter values of a group of neighboring sample positions within the polygon meet the conditions for a specified storage mode. The render processor 810 may also store parameter values (rendered for a first sample position of a group of N neighboring sample positions) in N memory locations corresponding to the N neighboring sample positions in memories 820–840. In some embodiments, the parameter values rendered for a first sample position are stored in a plurality of memories with one write transaction. In some embodiments, the render processor is configured to code the parameter values rendered for a first sample position. The code specifies which memories should receive the coded parameter values and each memory is configured to read the code and determine if the memory should receive the coded parameter values.

In some embodiments, additional components may be connected to the system including one or more display devices 84, one or more input devices 86–88, and/or a host processor 82. In some embodiments, the display device 84 may be any of various types of display monitors or display devices (e.g., a CRT, LCD, or gas-plasma display). Various input devices may be connected to the system, including a keyboard 86, a mouse 88, and/or other input device (e.g., a trackball, digitizer, tablet, six-degree of freedom input device, head tracker, eye tracker, data glove, or body sensors).

Methods for Storage of a Sample to Multiple Memory Locations—FIGS. 9a–9d

FIGS. 9a, 9b, 9c, and 9d describe several embodiments of a method to store rendered parameter values for one sample position in multiple memory locations that correspond to neighboring sample positions. Parameter values include, but are not limited to color values (red, green, and/or blue), alpha, and Z. The mode of storing is referred to herein as mode N, where N is a positive integer. In particular, for mode 1, each of the plurality of memory locations receives parameter values rendered for the corresponding sample position (no duplication). For mode 2 (also referred to as Buddy Mode), two memory locations may be designed to receive parameter values for two neighboring sample positions identical to the parameter values rendered for the first sample position of the two sample positions. The two neighboring sample positions may form a 1×2 sample array and the first sample may be an even numbered sample. For mode 4 (also referred to as Quad Mode), four memory locations may be designed to receive parameter values for four neighboring sample positions identical to the parameter values rendered for the first sample position of the four sample positions. The four neighboring sample positions may form a 2×2 sample array with the first member a first even numbered sample position. For mode N, the plurality of memory locations is designed to receive parameter values for N neighboring sample positions identical to the parameter values rendered for the first sample position of the N sample positions. In some embodiments, an additional mode 0 may be utilized. For mode 0, a plurality of memory locations may be designed to receive parameter values for all sample positions within the polygon identical to the parameter values rendered for the first sample position within the polygon.

The render processor may be configured to process each sample individually for those cases of a 1×2 sample array that has one sample position outside the polygon or a 2×2 sample array that has one to three sample positions outside the polygon. Similar situations may exist for sample arrays for other storage modes. In addition, for modes where N is not a multiple of 2, in some embodiments, there may be reduced benefits.

In some embodiments, the user may specify the storage mode N and the media processor 14 may incorporate the specified mode with the graphics data for a polygon. In other embodiments, the storage mode may be set for all processing, for the processing of regions of the image such as the sky, or for processing large objects with insubstantial differences in color. In still other embodiments, the mode may be varied in response to a need for a continued real time display of a very complex image or for situations where the complexity of the image changes dramatically in real time.

As used herein, the term "insubstantial differences" may include occurrences in some embodiments where parameter values corresponding to neighboring regions, samples, and/or pixels may change less than 10%. In other embodiments, the term "insubstantial differences" may include occurrences where parameter values corresponding to neighboring regions, samples, and/or pixels may change less than 5%. In still other embodiments, the term "insubstantial differences" may include occurrences where parameter values corresponding to neighboring regions, samples, and/or pixels may change less than 1%. In yet other embodiments, the user may set a very high value for "insubstantial differences" to increase processing speed.

Figure 9A:
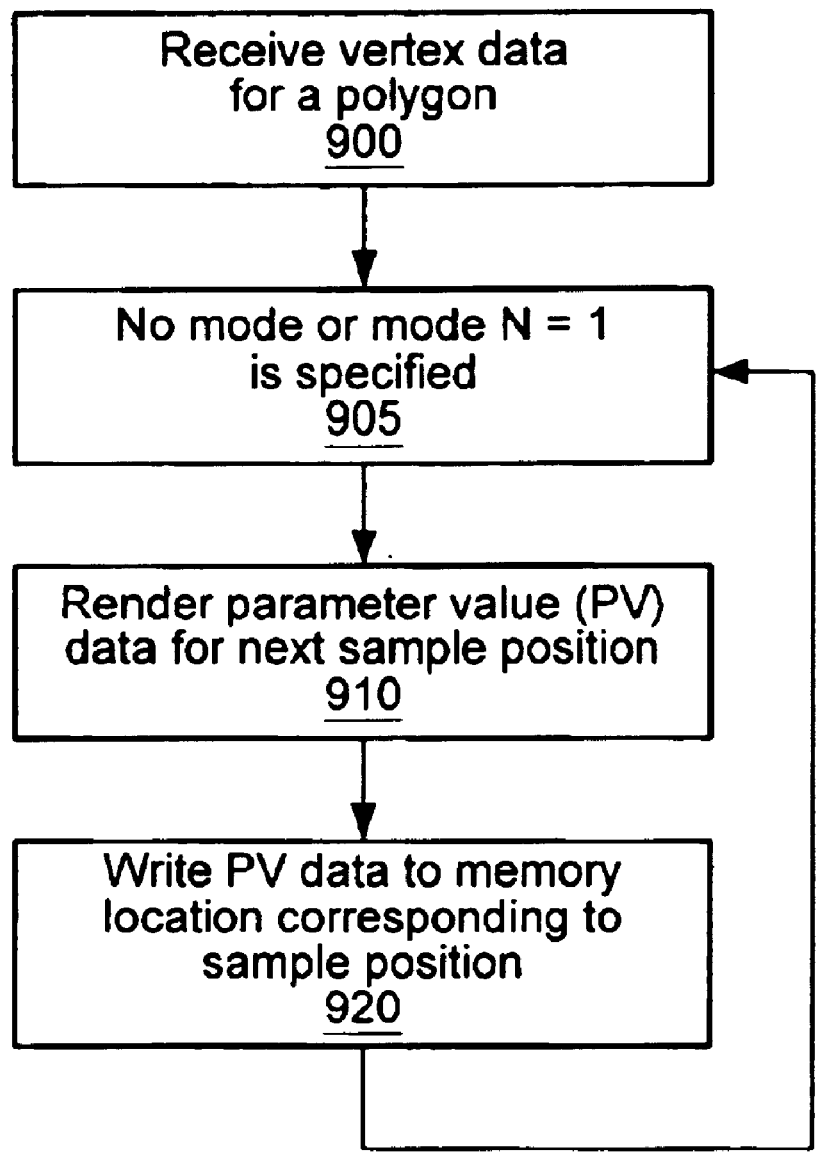
FIG. 9a is a flowchart of one embodiment of a method for rendering three-dimensional images.

FIG. 9a describes a normal rendering method of receiving 3-D graphics data corresponding to vertex data for a polygon (step 900) that specifies mode 1 or no mode (step 905), rendering parameter values for a sample position within the polygon using the vertex data (step 910), and storing the rendered parameter values in a memory location that corresponds to the sample position (step 920).

Figure 9B:
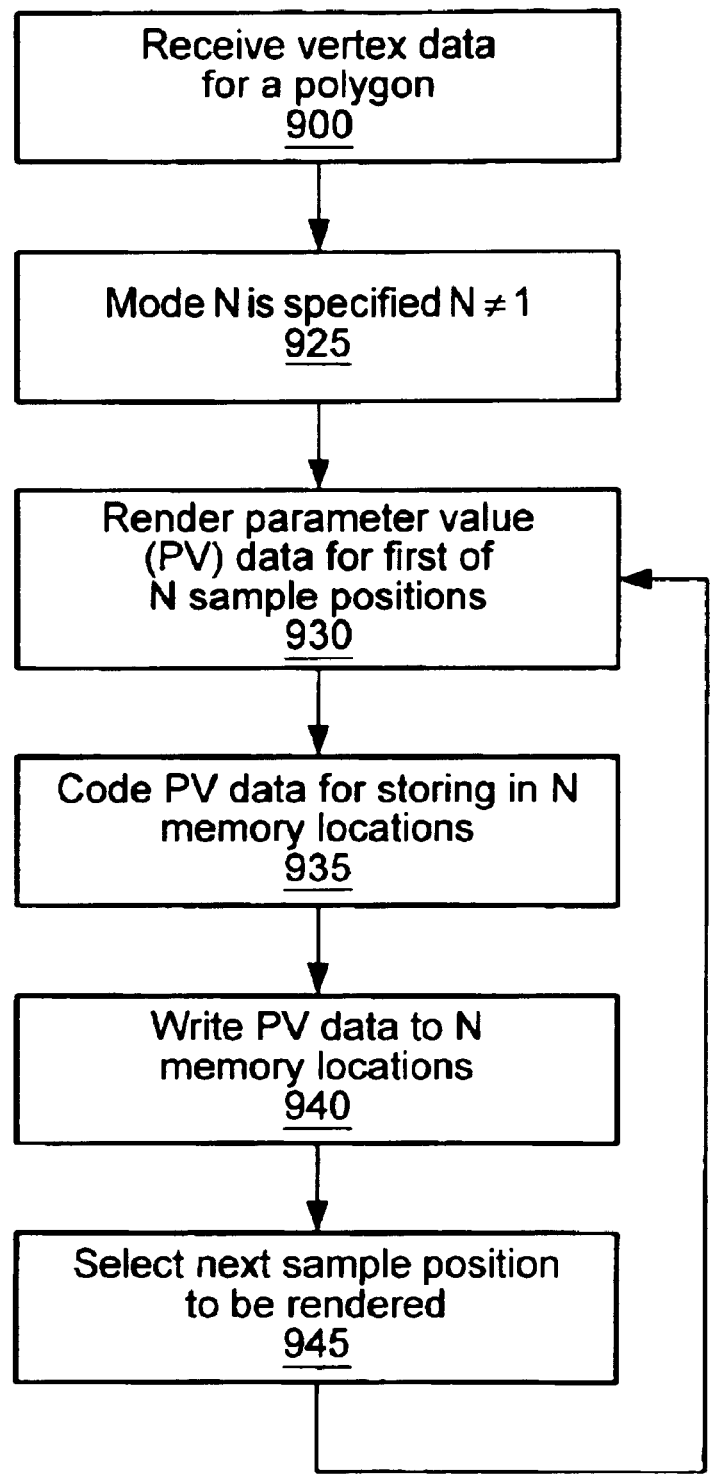
FIG. 9b is a flowchart of another embodiment of a method for rendering three-dimensional images.

FIG. 9b describes some embodiments of a method for storage of a rendered sample to multiple memory locations. The method includes: receiving 3-D graphics data corresponding to vertex data for a polygon (step 900) that specifies a mode N, for N>1 (step 925), rendering parameter values, using the vertex data, for a first sample position of a group of N neighboring sample positions within the polygon (step 930), coding the parameter values to enable storing in N memory locations (step 935), and writing the parameter values to N memory locations that correspond to the N neighboring sample positions (step 940). The next sample position to be rendered may be selected and the steps 930–945 may be repeated (step 945).

In some embodiments, each memory location has the same address in a plurality of separate memories attached to one data bus and each of the memories may be capable of reading the write enable code. In these embodiments, a single write transaction may store parameter values in N memory locations. In some embodiments, the plurality of memory locations may be within a plurality of allocated sections of one or more memories and may require multiple write transactions.

Figure 9C:
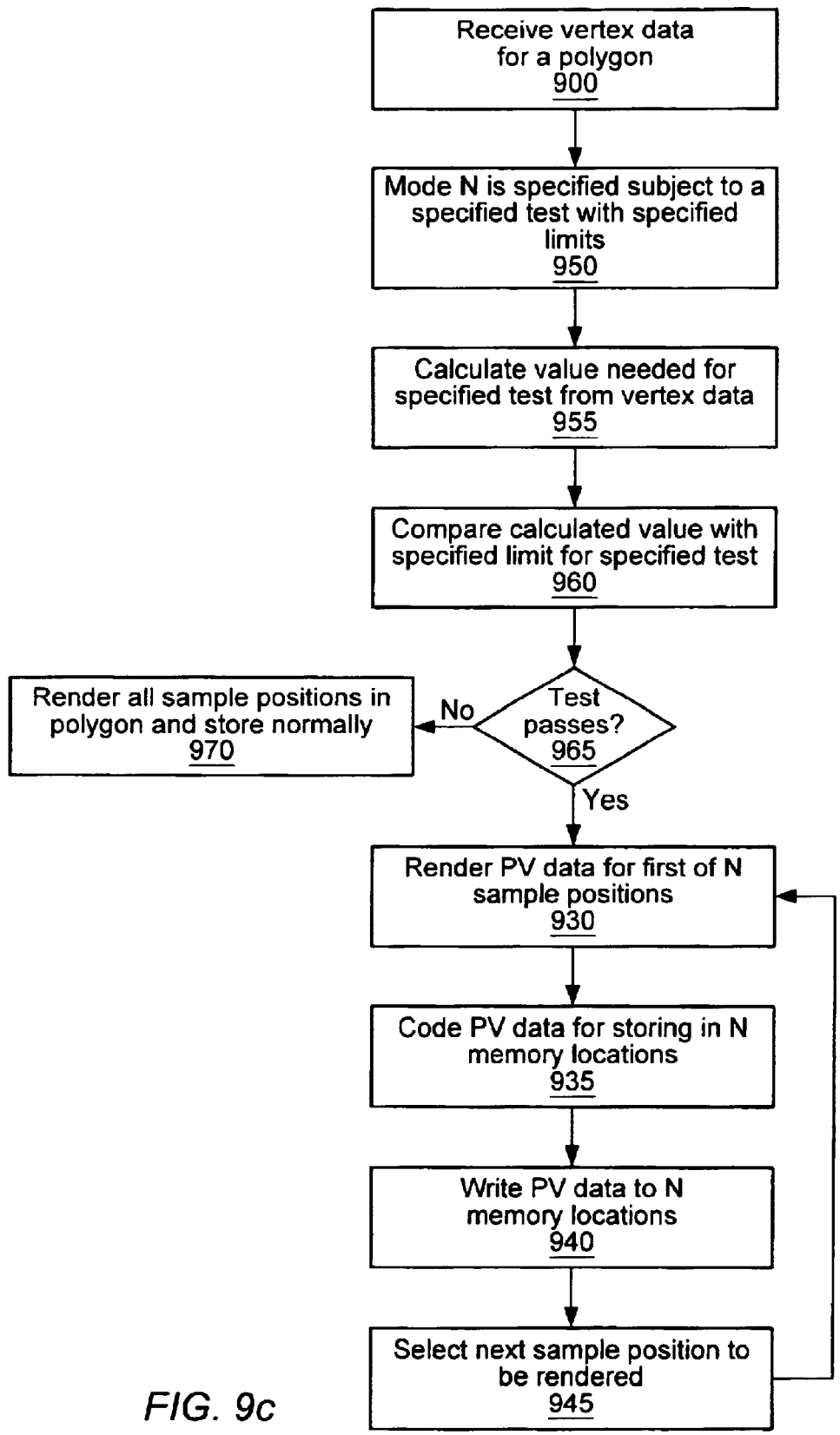
FIG. 9c is a flowchart of yet another embodiment of a method for rendering three-dimensional images.

FIG. 9c describes other embodiments of a method for storage of a rendered sample to multiple memory locations. The method includes: receiving 3-D graphics data corresponding to vertex data for a polygon (step 900) that specifies a mode N, subject to a specified test with specified limits (step 950), calculating the value (or values) needed for the specified test from vertex data (step 955), and comparing the calculated value with the specified limit (step 960). If the test does not pass, then all sample positions within the polygon are rendered and stored normally (step 970). If the test passes, then the method continues by rendering parameter values, using the vertex data, for a first sample position of a group of N neighboring sample positions within the polygon (step 930), coding the parameter values to enable storing in N memory locations (step 935), and writing the parameter values to N memory locations that correspond to the N neighboring sample positions (step 940). The next sample position to be rendered may be selected and the steps 930–945 may be repeated for additional sample positions within the polygon (step 945).

In some embodiments with a test condition, a multiple storage mode may only be utilized for polygons greater than a certain size. The polygon size may be calculated from vertex data. In some embodiments, the certain size may be user specified.

In other embodiments with a test condition, a multiple storage mode may only be utilized for polygons that have an absolute Z slope less than a threshold value. The Z slope may be a measure of the rate of change of Z across the polygon. In some embodiments, a Z slope may be calculated by adding the absolute rate of change of Z (absolute dz/dx) across the maximum width of the polygon and the absolute rate of change of Z (absolute dz/dy) across the maximum height of the polygon. In still other embodiments, the maximum rate of change of Z across the polygon may be calculated and compared to a specified threshold value. In some embodiments, the threshold value may be one. In still other embodiments, the threshold value may be selected from the range of 0.25 to 0.5. In some embodiments, the user may specify the threshold value. In some embodiments, the user may utilize a high threshold value as a means to ensure real time images.

In some embodiments with a test condition, a multiple storage mode may only be utilized for polygons that have insubstantial differences between parameter values for neighboring sample positions within the polygon. In other embodiments, the parameter values of neighboring sample positions within the polygon may have absolute differences less than a pre-defined metric or a maximum value. In still other embodiments, the user may specify a pre-defined metric or a maximum value. In some embodiments, the differences may be percentage differences, and the maximum value may be a percentage value. In some embodiments, absolute differences between parameter values of the vertexes of the polygon may be evaluated and compared with the pre-defined metric or the maximum value to determine if the test condition may be satisfied.

Figure 9D:
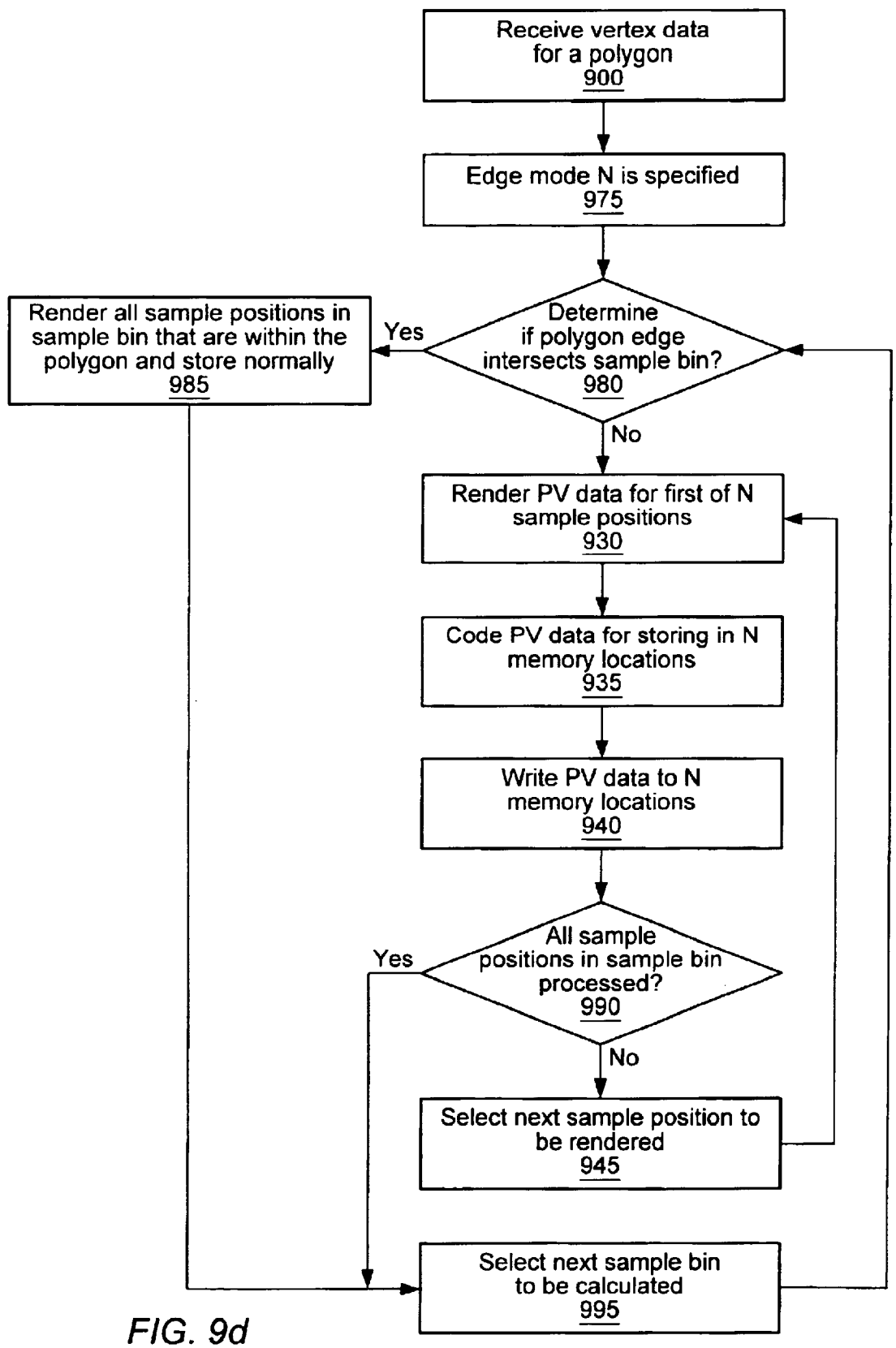
FIG. 9d is a flowchart of still another embodiment of a method for rendering three-dimensional images.

FIG. 9d describes still other embodiments with a test condition, referred to as Edge mode N. These methods include: receiving 3-D graphics data corresponding to vertex data for a polygon (step 900) that specifies Edge mode N (step 975) and determining if an edge of the polygon intersects the sample bin (step 980). If an edge of the polygon does intersect the sample bin, each sample position within the polygon may be individually rendered and stored (step 985). If an edge of the polygon does not intersect the sample bin, then the method continues by rendering parameter values, using the vertex data, for a first sample position of a group of N neighboring sample positions within the polygon (step 930), coding the parameter values to enable storing in N memory locations (step 935), and writing the parameter values to N memory locations that correspond to the N neighboring sample positions (step 940). The method checks for unprocessed samples remaining in the sample bin (step 990) and if unprocessed samples do remain, the method repeats steps 930–940 & 990. If all samples of the sample bin have been processed, the next sample bin is selected (step 995) and the method returns to step 980.

The efficiency of the various methods discussed may vary with the selection of a storage mode N, and may be influenced by the number of individual memories connected to a common bus and the number of samples per pixel specified.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for rendering three-dimensional images, the method comprising:
    receiving 3-D graphics data corresponding to a polygon, wherein the 3-D graphics data includes vertex data;
    calculating a Z slope using the vertex data, wherein the Z slope characterizes a rate of change of Z across the polygon;
    determining if the absolute Z slope is less than a threshold value, wherein, if the absolute Z slope is less than the threshold value, then:
    rendering parameter values for a first sample of a plurality of neighboring samples; and
    storing parameter values rendered for the first sample in a plurality of memory locations, wherein the plurality of memory locations correspond to the plurality of neighboring samples.

2. The method of claim 1, wherein calculating a Z slope comprises adding the absolute rate of change of Z across the maximum width of the polygon and the absolute rate of change of Z across the maximum height of the polygon.

3. The method of claim 1, wherein each memory location has the same address in a plurality of separate memories, and wherein the plurality of separate memories is attached to a data bus.

4. The method of claim 3, wherein the plurality of separate memories comprises 2 memories, 4 memories, 6 memories or 8 memories.

5. The method of claim 3, wherein the plurality of separate memories comprises N memories, wherein N is a positive integer greater than one.

6. The method of claim 3, wherein rendering further comprises sending a write enable code with the parameter values rendered for the first sample position, wherein the write enable code is used by each memory to determine if the memory will receive the parameter values rendered for the first sample position.

7. The method of claim 1, wherein each of the plurality of memory locations is within one of a plurality of allocated sections of one or more memories.

8. The method of claim 1, further comprising receiving user input specifying the threshold value.

9. The method of claim 1, wherein storing further comprises one of the modes N, wherein N is a non-negative integer, and wherein:
    for a mode 0, the plurality of memory locations is designed to receive identical parameter values for all sample positions within the polygon;
    for a mode 1, each of the plurality of memory locations receives parameter values rendered for the corresponding sample position;
    for a mode 2, the plurality of memory locations is designed to receive parameter values for two neighboring sample positions identical to the parameter values rendered for the first sample position of the two sample positions;
    for a mode 4, the plurality of memory locations is designed to receive parameter values for four neighboring sample positions identical to the parameter values rendered for the first sample position of the four sample positions; and
    for a mode N, the plurality of memory locations is designed to receive parameter values for N neighboring sample positions identical to the parameter values rendered for the first sample position of the N sample positions.

10. The method of claim 9, further comprising receiving user input specifying N.

11. The method of claim 9, wherein for said mode 2 the two neighboring sample positions form a 1×2 sample array with the first sample position an even numbered sample position.

12. The method of claim 9, wherein for said mode 4 the four neighboring sample positions form a 2×2 sample array with the first sample position a first even numbered sample position.

13. The method of claim 9, further comprising receiving user input specifying one of said modes and a corresponding threshold value.

14. The method of claim 1, further comprising generating pixel values from a corresponding set of sample values and outputting the pixel values to a display.

15. The method of claim 1, wherein parameter values comprise one or more of color values, alpha, and Z.

16. A graphics system for rendering three-dimensional images, the system comprising:

an input for receiving 3-D graphics data corresponding to a polygon, wherein the 3-D graphics data includes vertex data;

a plurality of memories for storing parameter data for samples;

a render processor coupled to the input and the plurality of memories, wherein the render processor is operable to calculate a Z slope, wherein the Z slope characterizes a rate of change of Z across the polygon;

wherein the render processor is operable to determine if the absolute Z slope is less than a threshold value, and if the absolute Z slope is less than a threshold value, then the render processor is operable to store parameter values rendered for a first sample position selected from a group of neighboring sample positions in memory locations corresponding to two or more of the neighboring sample positions in one or more of the plurality of memories.

17. The system of claim 16, wherein the parameter values rendered for a first sample position are stored in a plurality of memories with one write transaction.

18. The system of claim 16, further comprising one or more display devices connected to the graphics system.

19. The system of claim 16, further comprising one or more input devices connected to the graphics system.

20. The system of claim 16, further comprising a host processor, one or more input devices, and one or more display devices connected to the graphics system.

\* \* \* \* \*